United States Patent [19]

Zwier

[11] Patent Number: 4,628,632

[45] Date of Patent: Dec. 16, 1986

[54] EDGING STRIP

[76] Inventor: Daniel G. Zwier, 2435 Woodcliff La., Grand Rapids, Mich. 49506

[21] Appl. No.: 684,536

[22] Filed: Dec. 21, 1984

Related U.S. Application Data

[63] Continuation-in-part of Ser. No. 567,026, Dec. 30, 1983, abandoned.

[51] Int. Cl.$^4$ .............................................. A01G 1/00
[52] U.S. Cl. ...................................................... 47/33
[58] Field of Search .................... 47/33, 47, 23, 28, 25, 47/32; 256/19, 1; 411/451; 24/3 J, 11 HC, 11 F, 11 M; 52/102, 103; 339/217 S, 258 R, 47 R

[56] References Cited

U.S. PATENT DOCUMENTS 3,472,133 10/1969 Ziehm, Jr. ................................. 47/33
4,124,264 11/1978 Kato et al. ......................... 339/217 S

FOREIGN PATENT DOCUMENTS 1478610  7/1977  United Kingdom ............ 339/217 S Primary Examiner—Robert A. Hafer
Assistant Examiner—Bradley M. Lewis
Attorney, Agent, or Firm—Flynn, Thiel, Boutell & Tanis

[57] ABSTRACT

An edging strip useful in landscaping and other uses. The edging strip is an aluminum elongate extrusion having a generally uniform thickness. The strip, in vertical orientation thereof, has plural elongated grooves in one side thereof extending lengthwise of the strip and being vertically spaced from one another. The strip further has plural ribs projecting outwardly from an opposite side thereof and opposite the grooves at a vertical location on the aforesaid opposite side coinciding with the location of the aforesaid grooves. Each of the grooves has a pair of vertically spaced sidewall surfaces and a vertically upright bottom wall surface. The lowermost sidewall surface of each groove has a wall surface that is flat and inclined to the horizontal and defining an acute angle with the bottom wall surface. Each rib has a side facing surface that is parallel to the bottom wall surface and an upwardly facing surface that is upwardly inclined and defining an acute angle to the aforesaid side facing surface of each rib. A stake is utilized which overlaps at least a portion of each strip and has structure thereon for effecting a securement of each strip to the stake to prevent relative vertical movement therebetween.

13 Claims, 8 Drawing Figures

EDGING STRIP

CROSS REFERENCE TO RELATED APPLICATION

This application is a continuation-in-part of application Ser. No. 567,026, filed on Dec. 30, 1983, now abandoned.

FIELD OF THE INVENTION

This invention relates to an edging strip and stake useful in landscaping and other uses and, more particularly, relates to an elongate, extruded aluminum edging strip having grooves and ribs thereon and a stake, both of which are effective in preventing the strip from being heaved upwardly out of the soil due to movements of the soil caused by freeze/thaw variations in the temperature of the soil as well as the expansion and contraction of the soil due to variations in the amount of water that has been absorbed in the soil.

BACKGROUND OF THE INVENTION

It is well known in this art to utilize edging strips for purposes of preventing the creeping of grass into a flower bed, for example, or to prevent the spillover of gravel or dirt onto a grass area. Further, it is known to use edging strips to highlight flower beds, pathways, garden plots and tree or shrub plantings. Both wooden boards and metal strips have been used for these purposes for many years. One particular strip, namely, an extruded aluminum strip is shown and described in U.S. Pat. No. 3,472,133.

It is an object of the present invention to provide an edging strip useful in landscaping and other uses and which is comprised of an extruded aluminum strip having vertically spaced recesses on one side face thereof and ribs on an opposite side thereof, which ribs correspond to the locations for grooves on the first-mentioned side.

It is a further object to provide an edging strip, as aforesaid, which has structure thereon operatively connectible to structure on a stake to effect an interlocking therebetween for the purpose of preventing a major relative vertical movement therebetween.

It is a further object of this invention to provide an edging strip, as aforesaid, which has structural members thereon adapted to cooperate with structural members on a stake to effect an interlock between mutually adjacent ends of a pair of edging strips for purposes of preventing them from separating in a horizontal direction after being placed in the earth.

It is a further object of the invention to provide an edging strip, as aforesaid, which includes structure enabling mutually adjacent elongated edging strips, stretching through differing soils, for example, to undergo differing amounts of upheaval without resulting in an upheaval of the splicer stake holding the mutually adjacent ends of the two strips in the ground.

It is a further object of the invention to provide an operative connection between the midlength portion of an edging strip and a stake whereby a major relative vertical movement therebetween is prevented while simultaneously allowing for a relative pivotal movement therebetween about an axis perpendicular to the plane of the edging strip.

SUMMARY OF THE INVENTION

The objects and purposes of this invention have been met by providing an edging strip useful in landscaping and other uses comprised of an extruded aluminum strip having a generally uniform thickness, the strip, in vertical orientation thereof, having plural elongated grooves in one side thereof extending lengthwise of the strip and being vertically spaced from one another. The strip further has plural ribs projecting outwardly from an opposite side of the strip and opposite the grooves at a vertical location thereon coinciding with the location of the grooves. Each of the grooves has a pair of vertically spaced sidewall surfaces and a vertically upright bottom wall surface. The lowermost sidewall surface of each groove has a wall surface that is flat and inclined to the horizontal and defining an acute angle with the bottom wall surface. Each rib has a side facing surface that is parallel to the bottom wall surface and an upwardly facing surface that is upwardly inclined and defining an acute angle to the side facing surface.

The objects and purposes are also met by providing a combination of a stake and a strip, the stake having a U-shaped top portion adapted to fit over the upper edge of the strip. Interlocking structure is provided on the stake and the strip for effecting an interlock therebetween preventing separation as well as enabling mutually adjacent strips to pivot with respect to one another about an axis generally perpendicular to the plane of the strips.

BRIEF DESCRIPTION OF THE DRAWINGS

Further objects and purposes of this invention will be apparent to persons acquainted with apparatus of this general type upon reading the following specification and inspecting the accompanying drawings, in which.

Figure 1:
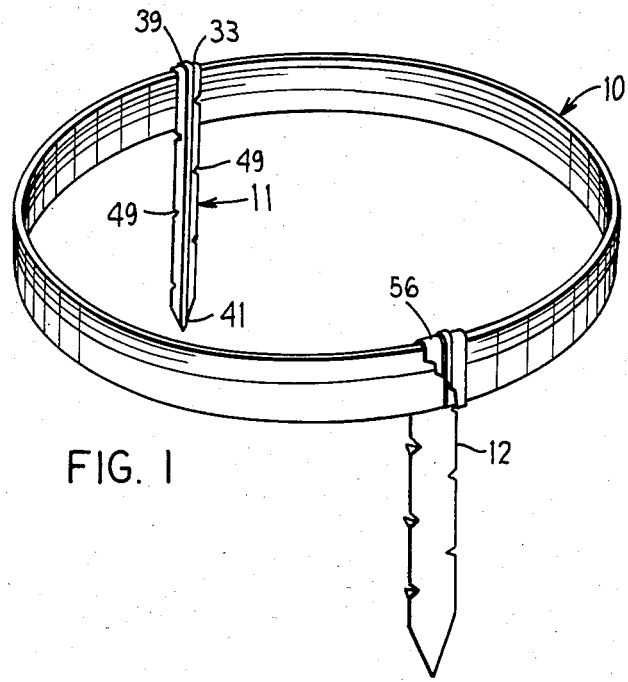
FIG. 1 is a perspective view of the edging strip embodying the invention in a circular arrangement and employing the use of a pair of stakes to effect a holding of the edging strip and the stakes in the soil.

Certain terminology will be used in the following description for convenience in reference only and will not be limiting. The words "up" and "down" will designate directions in the drawings to which reference is made. The words "in" and "out" will refer to directions toward and away from, respectively, the geometric center of the device and designated parts thereof. Such terminology will include the words above specifically mentioned, derivatives thereof and words of similar import.

DETAILED DESCRIPTION

FIG. 1 illustrates an assembly of the edging strip 10 and a pair of stakes 11 and 12, the stake 11 being a hold-down stake and the stake 12 being a combination hold-down and splicer stake. The specific structure of each of the elements of the combination will now be discussed in detail.

Figure 3:
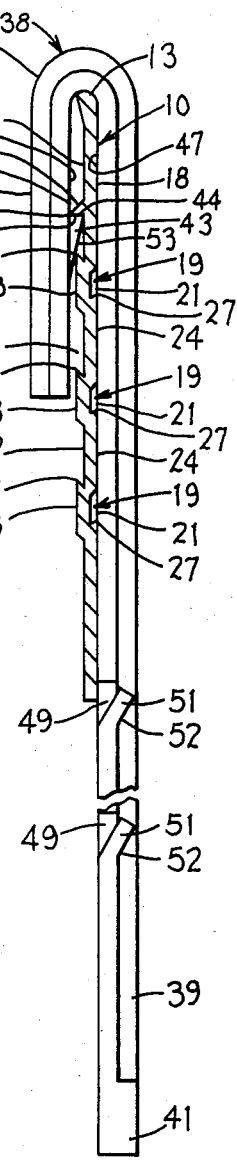
FIG. 3 is a sectional view taken along the line III—III of FIG. 2.

The edging strip 10 is comprised of an elongate, extruded aluminum strip having a generally uniform thickness. The strip, in vertical orientation thereof, has a rounded top edge 13 (FIG. 3). Spaced vertically therebelow is an elongate rib 14 projecting outwardly from the side face 16 of the strip 10. The rib 14 has a downwardly facing surface 17 thereon, the purpose of which will be set forth in more detail before. The side surface 18 of the strip 10, namely, that surface which is opposite the side surface 16, is flat and smooth immediately opposite the side having the rib 14 thereon. Spaced at intervals below the rib 14 are plural undulations 19 in the material of the strip 10. More specifically, each undulation consists of a groove on one side of the strip and a rib projecting outwardly from the immediate opposite side in order to preserve the uniform thickness of the aluminum strip. In this embodiment, the grooves 21 on the side 18 of the strip are of the same size but are smaller than the equally sized grooves 22 in the side 16 of the strip 10. Similarly, the ribs 23 which project out from the side 16 of the strip 10 and at a location which is immediately opposite the grooves 21 are of equal size but are smaller than the equally sized ribs 24 which project outwardly from the side 18 of the strip 10.

Figure 8:
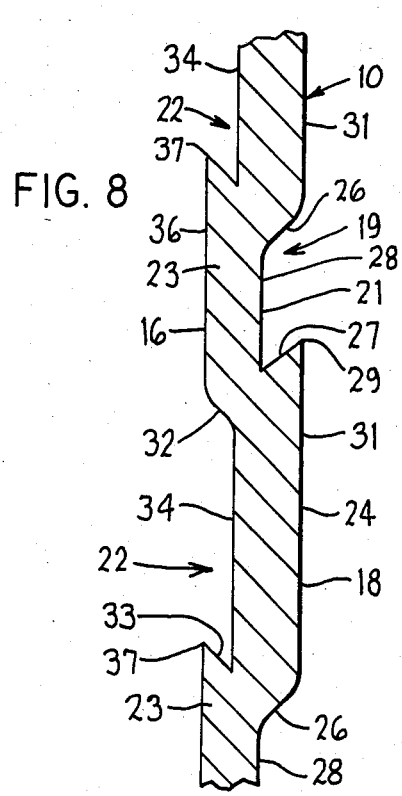
FIG. 8 is an enlarged fragmentary cross-sectional view of a segment of the edging strip.

Referring to FIG. 8, each of the grooves 21 has an upper sidewall 26 and a lower sidewall 27 bordering a bottom wall 28. The lowermost sidewall 27 has a wall surface that is flat and inclined to the horizontal and defining an acute angle with the bottom wall surface 28. An upwardly directed sharp edge 29 is provided between the sidewall surface 27 and the side facing surface 31 of the rib 24. The upper sidewall 26 is, in this embodiment, rounded between the bottom wall 28 and the side facing surface 31 of the next adjacent rib 24. Similarly, and referring to each groove 22 in the side 16 of the strip 10, they too have an upper sidewall 32, a lower sidewall 33 and a bottom wall 34. The bottom wall 34 is parallel to the bottom wall 28 and, in addition, is parallel to the side facing surface 31 on each of the ribs 24 and the side facing surface 36 on each of the ribs 23. The bottom sidewall 33 is flat and inclined to the horizontal and defines an acute angle with the bottom wall surface 34. A sharp edge 37 is provided between the sidewall surface 33 and the sidewardly facing surface 36 on the rib 23. The upper sidewall 32 is rounded between the bottom wall surface 34 and the side facing surface 36 of the next adjacent rib 23.

Figure 2:
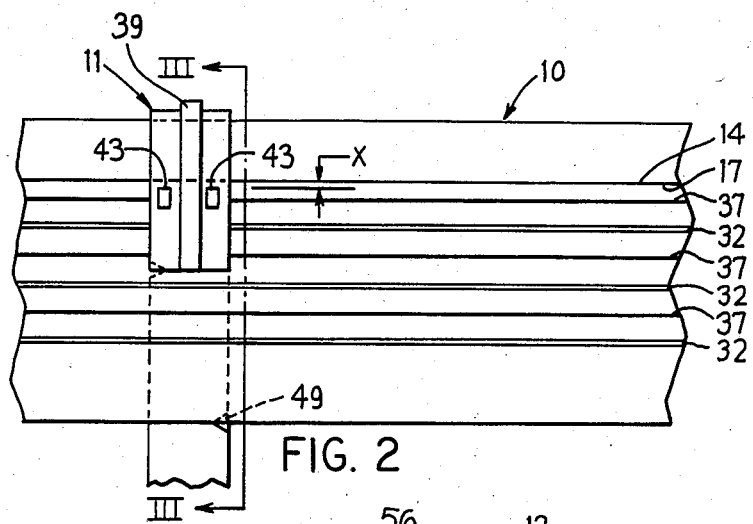
FIG. 2 is an enlarged side view of the edging strip and the stake operatively coupled thereto.

The hold-down stake 11 is comprised of an elongated extruded aluminum strip having a U-shape bend at one end thereof, as at 38 in FIG. 3. In this particular embodiment, a central rib 39 extends along the length of the strip on the outwardly facing side thereof. The lowermost end of the stake 11 remote from the U-shaped bend 38 is pointed as at 41 to facilitate an easier insertion into the earth. The inside surface of the leg 42 below the U-shaped bend 38 has a pair of horizontally, laterally spaced and inwardly projecting steps 43, the steps each having an upwardly facing surface 44. The spacing between an inwardly facing surface 46 of the leg 42 and an inwardly facing surface 47 opposed thereto is equal to or slightly larger than the thickness of the material of the edging strip from a sharp edge 48 on the rib 14 and the opposite side surface 18 to facilitate a snug holding of the edging strip therebetween. The interengagement between the upwardly facing surface 44 on the steps 43 and the downwardly facing surface 17 on the rib 14 will serve to interlock the edging strip 10 to the stake 11 and to prevent relative vertical movement therebetween. As shown in FIG. 2, the two steps 43 in the form of tabs punched out of the material of the stake 11 on opposite sides of the central rib 39 are spaced a small distance X from the surface 17 to purposefully permit a pivotal movement of the edging strip relative to the stake 11 and about an axis that extends perpendicular to the plane of the edging strip while simultaneously preventing a major relative vertical movement therebetween. The distance X is greater than a normal tolerance clearance space.

The stake 11 also has plural notches 49 cut or punched into the lateral edges thereof. In this particular embodiment, the material removed from the notch 51 remains fastened to the stake and is bent over as at 52 so as to define an upwardly inclined barb. That is, the bend 52 is located at the lower portion of the material 51. In this particular embodiment, the material 51 which is removed from the notch, preferably by a stamping operation, is bent outwardly of the stake on the side thereof which has the rib 39 thereon and on a side remote from the location of the edging strip 10. This construction will facilitate an easy insertion of the edging strip into the U-shaped bend 38. Further, the upwardly inclined surface 53 on the step 43 and the downwardly inclined surface 54 on the rib 14 will engage during the insertion of the edging strip 10 into the U-shaped bend 48 and facilitate the movement of the rib 14 vertically past the step 43 to create the aforesaid interlock between the stake 11 and the edging strip 10.

Figure 4:
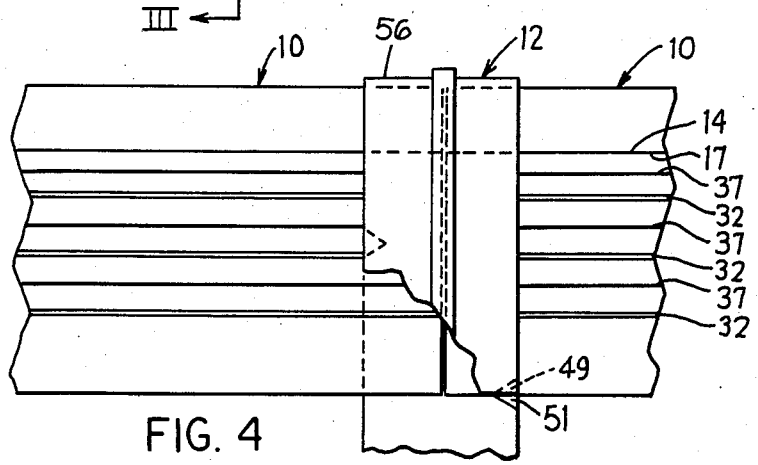
FIG. 4 is a side view of the mutually adjacent ends of an edging strip or a pair of edging strips with a splicer stake being utilized thereat to assist in keeping the mutually adjacent ends together.

The hold-down stake 11, particularly the U-shaped bend 38 thereof, houses or covers only a portion of the vertical extent of the edging strip 10 as shown in FIGS. 2 and 3. The hold-down and splicer stake 12 is slightly differently constructed in that the U-shaped bend 56 thereof houses the entirety of the edging strip material therebetween as shown in FIGS. 1 and 4. Further, the hold-down and splicer stake 12 is slightly wider than the hold-down stake 11, primarily because the mutually adjacent ends of a pair of edging strips are to be housed therein.

Figure 5:
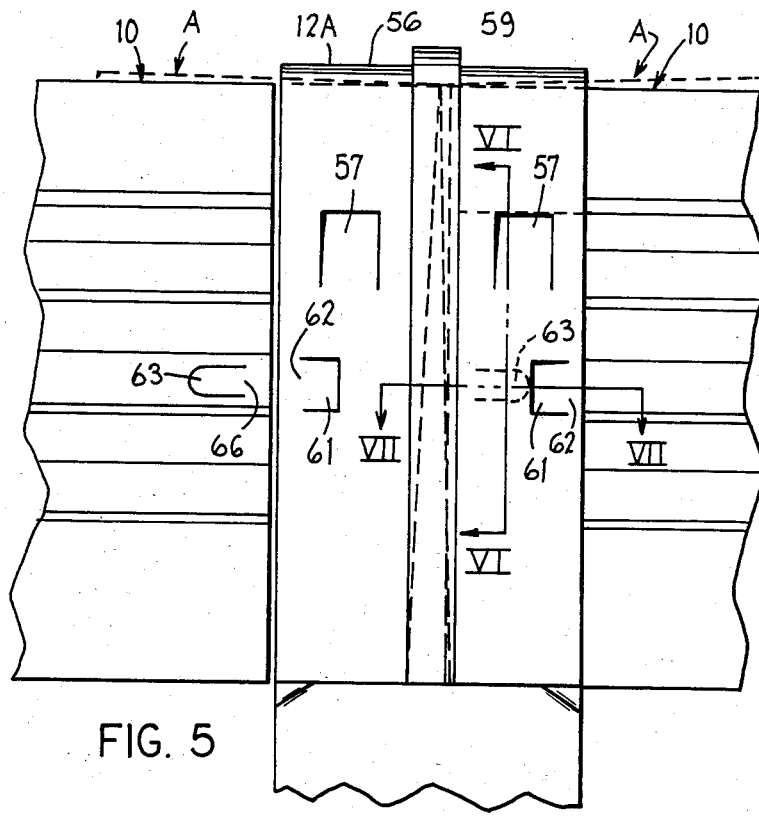
FIG. 5 is a slightly enlarged side view of a modified form of the hold-down and splicer stake and the edging strip having the additional capability of preventing a separation of the mutually adjacent ends of two strips and allowing for a pivotal movement with respect to each other and the splicer stake about an axis perpendicular to the plane of the strips.
Figure 6:
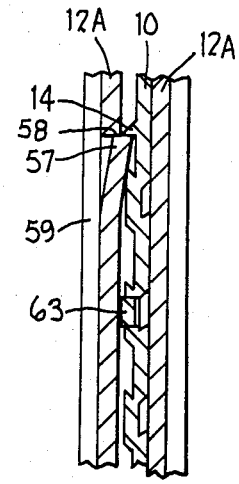
FIG. 6 is a sectional view taken along the line VI—VI of FIG. 5.
Figure 7:
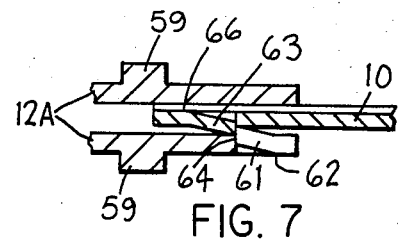
FIG. 7 is a sectional view taken along the line VII—VII of FIG. 5.

The modified embodiment of the hold-down and splicer stake 12A is shown in FIGS. 5 to 7. The general construction of the modified hold-down and splicer stake is generally the same as has been previously described hereinabove. A tab 57 is punched inwardly of the U-shaped bend 56 on each side of a central rib 59, the rib 59 being comparable to the rib 39. Thus, the rib 14 on the mutually adjacent ends of the edging strip 10 will operatively cooperate with the upper surfaces 58 (FIG. 6) on each of the tabs 57 to facilitate the aforesaid interlock therebetween.

In addition to the aforementioned tabs 57, two additional tabs 61 are punched inwardly of the U-shaped bend 56 on opposite sides of the central rib 59 and below the tabs 57, as illustrated in FIG. 5. In this particular embodiment, the tabs 61 are bent inwardly about a bend 62 that is oriented between the tabs 61 and the adjacent lateral edge. The bend axis extends parallel to the lateral edge of the stake. In addition, tabs 63 are formed in the mutually adjacent end portions of the edging strips 10 and project from a side thereof to operatively cooperate with the edge surface 64 (FIG. 7) of the tabs 61. Thus, and since the tabs 63 are bent about a bend 66 that is oriented between the tabs 63 and the end of the edging strip 10 and the bend axis thereof extends parallel to the end of the edging strip 10, the tabs 61 and 63 will be capable of bypassing one another during a horizontal insertion of the edging strip 10 into the U-shaped bend 56 of the hold-down and splicer stake 12A to thereby effect a coupling of the edging strips 10 to the hold-down and splicer stake 12A. That is, once assembled, the edging strips 10 are incapable of being pulled laterally from the U-shaped portion 56 of the hold-down and splicer stake 12A due to the obstruction formed by the operative connection between the tabs 61 and 63. However, there will remain a sufficient amount of clearance between the mutually adjacent ends of the two strips to permit a pivotal movement of the strips relative to each other and the splicer stake about an axis generally perpendicular to the plane of the strips. This capability is important in that it allows for a movement of the soil at locations between the stakes which may be of a different magnitude than the magnitude of the soil movement at the stakes to thereby cause the strips embedded in the soil to move therewith and to pivot to, for example, the broken-line position illustrated in FIG. 5 at "A". That is, and in this particular embodiment, there is only one tab 63 punched into each end of the edging strip 10 and at a distance from the end thereof so that when two edging strips are placed end-to-end within the U-shaped bend 56, the mutually adjacent ends will be spaced from each other and the tabs 63 will be oriented inside of the tabs 61 to prevent a lateral separation of the mutually adjacent ends of the edging strips 10. Further, the tab 63 is oriented in a groove 21 of the edging strip 10 and projects outwardly from the side facing surface 36 of the rib 23. In this particular embodiment, the rib 23 selected is the second one down from the rib 14.

The aforementioned structure is also advantageous in that a wheel or wheels of a lawn mower, for example, rolling along the top edge of the edging strip will, due to the weight of the lawn mower, press the edging strip into the soil. As the mower approaches either a hold-down stake 11 or a hold-down and splicer stake 12, the movement of the edging strip will not affect or alter the position of the stake in the ground and, therefore, the stake will continue to hold the edging strip in the ground. That is, the purposeful provision of a relative movement capability between the edging strip and the stake will prevent the stake from being uprooted or pulled out of the ground caused by the flexing of the edging strip material.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. Edging useful in landscaping and other uses, comprising:
   an elongated extruded aluminum strip having a generally uniform thickness, said strip, in vertical orientation thereof, having plural elongated grooves in one side thereof, extending lengthwise of said strip and being vertically spaced from one another, said strip further having plural ribs projecting outwardly from an opposite side of said strip and opposite said grooves at a vertical location on said opposite side coinciding with the location of said grooves, each said groove having a pair of vertically spaced sidewall surfaces and a vertically upright bottom wall surface, the lowermost sidewall surface of each groove having a wall surface that is flat and inclined to the horizontal and defining an acute angle with said bottom wall surface, each said rib having a side facing surface that is parallel to said bottom wall surface and an upwardly facing surface that is upwardly inclined and defining an acute angle to said side facing surface.

2. The edging strip according to claim 1, wherein said strip has a segment adjacent the lower edge thereof which is free of ribs and grooves.

3. The edging strip according to claim 1, including a further rib intermediate a top edge of said strip and the uppermost ones of said ribs and grooves, said further rib having a flat, downwardly facing surface opposing said upwardly facing surface on the uppermost ones of said ribs, and an elongated stake oriented so that the longitudinal axis thereof is perpendicular to the longitudinal axis of said strip, a portion of the upper end of said stake being bent back upon itself to define an inverted U, said strip being received between the legs of said inverted U, an inside surface of one of the legs of said U having a tab projecting outwardly therefrom and being adapted to engage said further rib.

4. The edging strip according to claim 3, wherein said stake has plural notches provided in the lateral side edges thereof.

5. The edging strip according to claim 3, wherein plural protuberances extend outwardly from a face of said stake on a side thereof remote from said portion of said upper end.

6. The edging strip according to claim 3, wherein said strip has at least one tab punched out from one side thereof and adjacent at least one end thereof, said tab being bent outwardly from a plane parallel to said side facing surface about an axis that extends vertically, said tab extending away from said axis toward the other end of said strip, said stake having stop means thereon adapted to engage said tab and prevent a lateral separation of said strip relative to said stake.

7. The edging strip according to claim 6, wherein said stake is adapted to operatively engage two of said strips oriented end-to-end, said stop means engaging a said tab on each strip to prevent a lateral separation of said strips from each other relative to said stake, said stop means further facilitating a pivotal movement of said strips relative to said stake about an axis generally perpendicular to said plane.

8. The edging strip according to claim 6, wherein said tab is located in and punched out from one of said grooves and projects outwardly from a said side facing surface of one of said ribs located in said inverted U of said stake, said stop means on said stake also being oriented within and between the legs of said inverted U.

9. The edging strip according to claim 6, wherein the mutually adjacent ends of a pair of strips are placed end-to-end with the grooves and ribs thereon aligned, said inverted U of said stake overlying said mutually adjacent ends; wherein a said tab is provided on each mutually adjacent end of said strip and on a part thereof located within said U; and wherein said stop means includes a pair of stops, one each adapted to operatively engage said further rib on each said strip.

10. The combination of an edging strip useful in landscaping and other uses and a stake, comprising:

an elongated strip;

a stake having a U-shaped top portion adapted to fit over the upper edge of the said strip, an elongated segment of said stake extending beyond the lower edge of said strip; and interlocking means on said stake and said edging strip for effecting an interlock therebetween, said interlocking means including rib means adjacent the top of said strip and having a flat, downwardly facing surface, an inside surface of one of the legs of said U-shaped top portion having a tab projecting outwardly therefrom and being adapted to engage said rib, said interlocking means including a tolerance spacing between said tab and said rib means on said strip and said downwardly facing surface to purposefully permit a pivotal movement between said stake and said strip about an axis that is perpendicular to a plane containing said strip and without causing said stake to be urged upwardly out of the ground as said pivoting occurs.

11. The edging strip according to claim 10, wherein said strip has at least one tab punched out from one side thereof and adjacent at least one end thereof, said tab being bent outwardly from a plane parallel to said side facing surface about an axis that extends vertically, said tab extending away from said axis toward the other end of said strip, said stake having stop means thereon adapted to engage said tab and prevent a lateral separation of said strip relative to said stake.

12. The edging strip according to claim 11, wherein said stake is adapted to operatively engage two of said strips oriented end-to-end, said stop means engaging a said tab on each strip to prevent a lateral separation of said strips from each other relative to said stake, said stop means further facilitating a pivotal movement of said strips relative to said stake about an axis generally perpendicular to said plane.

13. The combination of an edging strip useful in landscaping and other uses and a stake, comprising:

an elongated strip;

a stake having a U-shaped top portion adapted to fit over the upper edge of the said strip, an elongated segment of said stake extending beyond the lower edge of said strip; and interlocking means on said stake and said edging strip for effecting an interlock therebetween, said interlocking means including rib means adjacent the top of said strip and having a flat, downwardly facing surface, an inside surface of one of the legs of said U-shaped top portion having a tab projecting outwardly therefrom and being adapted to engage said rib;

said strip having at least one tab punched out from one side thereof and adjacent at least one end thereof, said tab being bent outwardly from a plane parallel to said side facing surface about an axis that extends vertically, said tab extending away from said axis toward the other end of said strip;

said stake being adapted to operatively engage two of said strips oriented end-to-end, said stop means engaging a said tab on each strip to prevent a lateral separation of said strips from each other relative to said stake, said stop means further facilitating a pivotal movement of said strips relative to said stake about an axis generally perpendicular to said plane.

* * * * *